E. H. COTTRELL.
NEWSPAPER.
APPLICATION FILED JAN. 25, 1915.

1,387,837.

Patented Aug. 16, 1921.
5 SHEETS—SHEET 1.

Witnesses:
Harry G. Fleischer
F. George Barry

Inventor:
Edgar H. Cottrell
by attorneys

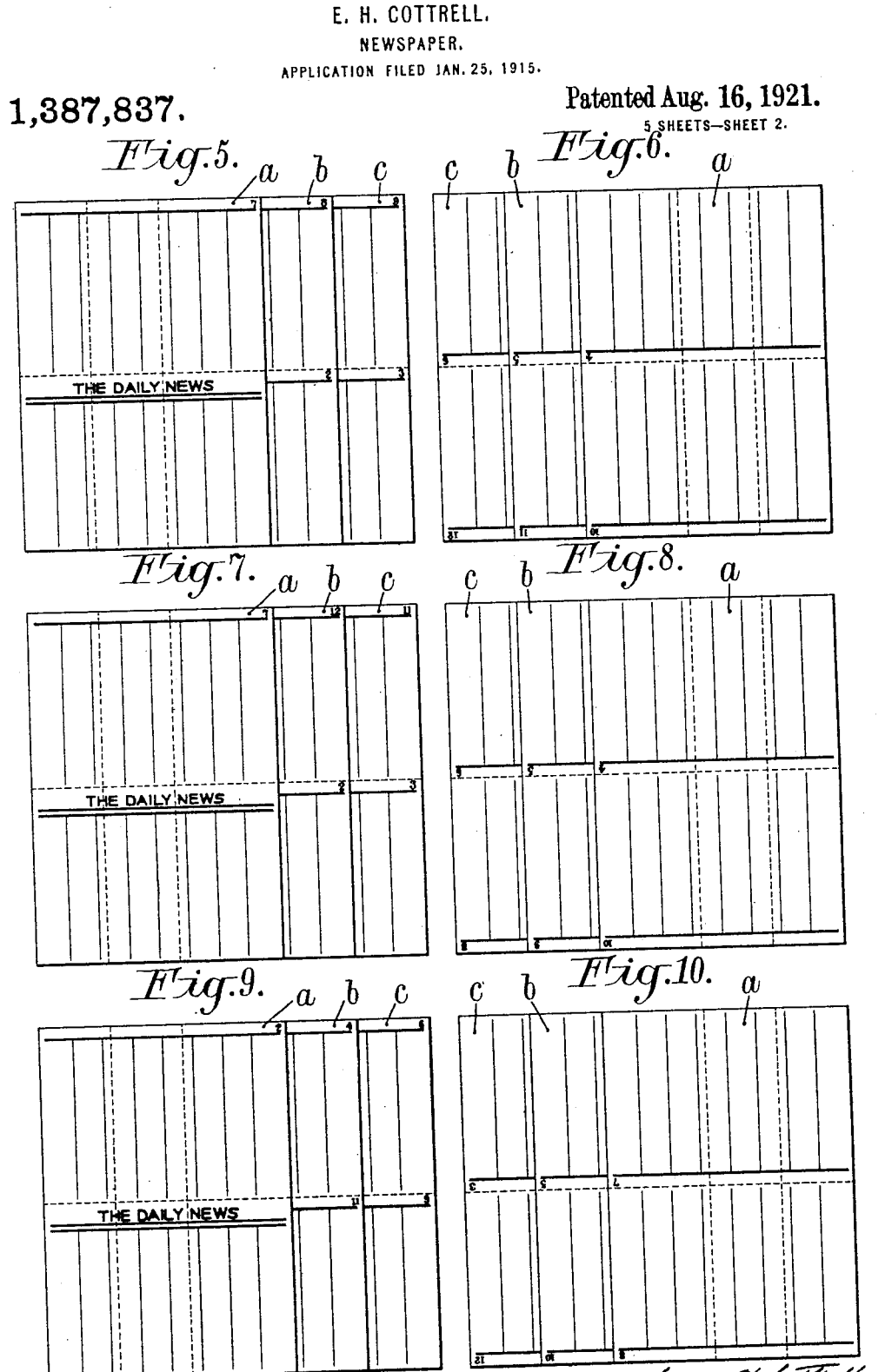

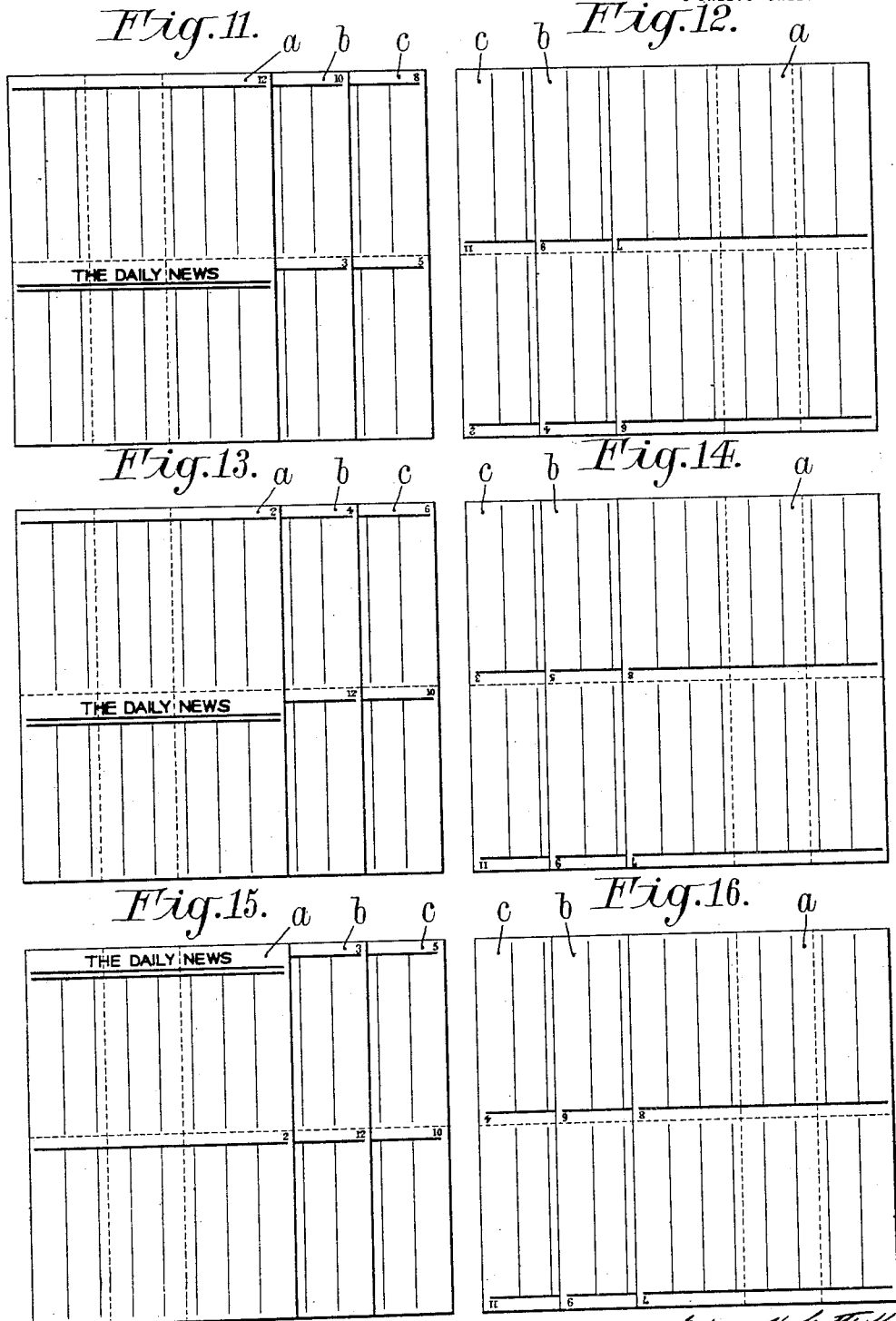

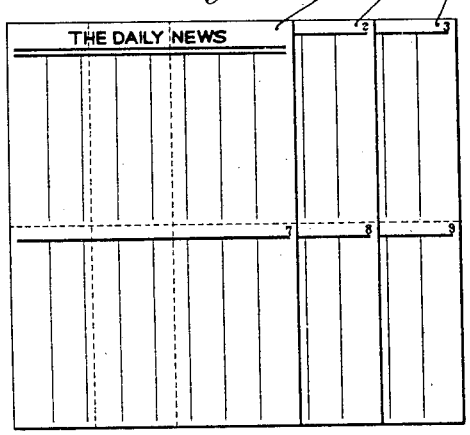
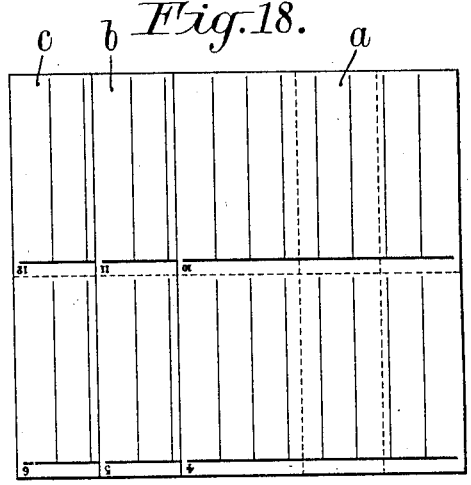
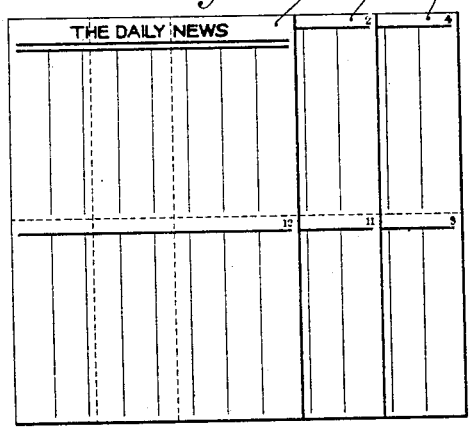
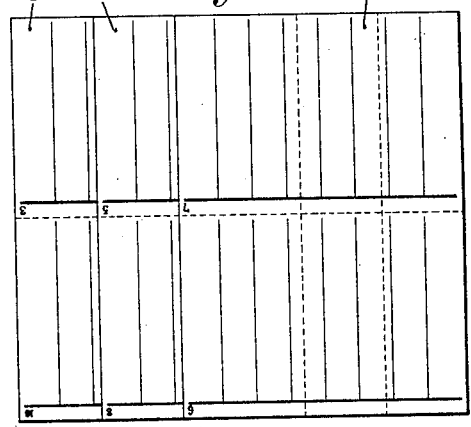
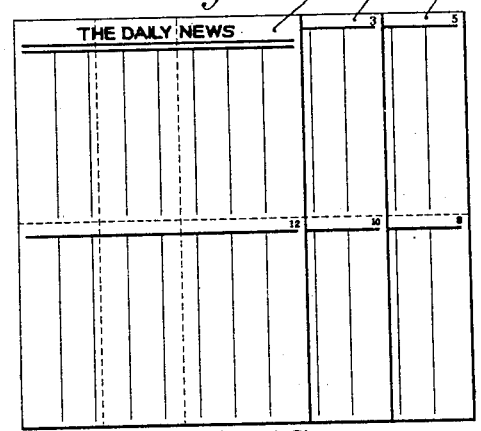
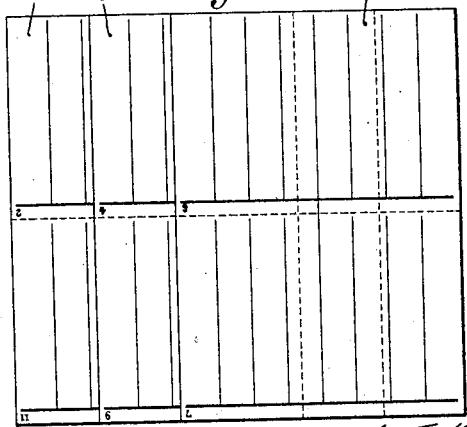

E. H. COTTRELL.
NEWSPAPER.
APPLICATION FILED JAN. 25, 1915.

1,387,837.

Patented Aug. 16, 1921.
5 SHEETS—SHEET 5.

UNITED STATES PATENT OFFICE.

EDGAR H. COTTRELL, OF WESTERLY, RHODE ISLAND.

NEWSPAPER.

1,387,837.  Specification of Letters Patent.  Patented Aug. 16, 1921.

Application filed January 25, 1915. Serial No. 4,228.

*To all whom it may concern:*

Be it known that I, EDGAR H. COTTRELL, a citizen of the United States, and resident of Westerly, in the county of Washington and State of Rhode Island, have invented a new and useful Improvement in Newspapers, of which the following is a specification.

In newspapers as usually produced where the leaves bearing the printed pages are approximately from sixteen to eighteen inches wide and from twenty-one to twenty-three inches long, it is well known that because of the very large size of the leaves, the location of the fold and the usual poor quality of paper, it is extremely difficult to hold the newspaper in a proper position for perusal and it is also difficult to turn the leaves over without wrinkling and tearing the paper and without using an undue amount of room, which latter is very undesirable where crowded conditions prevail as in public conveyances, etc.

The object of my invention is to overcome the defects and disadvantages above enumerated, by producing a newspaper in which the sheets are folded transversely to the columns of printed matter so that the newspaper may be very easily held in a convenient position for reading and permitting the very ready turning of the leaves, the newspaper at all times being kept within a reasonable size for easy perusal and handling.

A further object is to so arrange the printed matter that each side of each sheet will bear two printed pages arranged to read in the same direction, the two printed pages on one side of each sheet reading in one direction and the two printed pages on the other side of each sheet reading in the opposite direction.

Practical embodiments are represented in the accompanying drawings which illustrate a twelve-page newspaper having its sheets printed, assembled and folded according to my invention.

Figs. 5 and 6 are respectively front and back views on a smaller scale of the embodiment shown in Figs. 1 to 4 inclusive, with the sheets unfolded and partly separated to show more clearly the page arrangement.

Figs. 7 and 8 are similar views of a second embodiment,

Figs. 9 and 10 are similar views of a third embodiment,

Figs. 11 and 12 are similar views of a fourth embodiment,

Figs. 13 and 14 are similar views of a fifth embodiment,

Figs. 15 and 16 are similar views of a sixth embodiment,

Figs. 17 and 18 are similar views of a seventh embodiment,

Figs. 19 and 20 are similar views of an eighth embodiment,

Figs. 21 and 22 are similar views of a ninth embodiment, and

The three sheets are denoted by $a$, $b$ and $c$, each of which sheets is provided with two printed pages on each side thereof, the pages on each side reading in the same direction and the pages on one side of each sheet reading in one direction and the pages on the other side of each sheet reading in the opposite direction, in the present instance the two printed pages on the front side of each sheet reading downwardly and the two printed pages on the back side of each sheet reading upwardly.

The sheets are folded together transversely to the columns of reading matter along a line between the printed pages and are preferably secured together along said fold line.

In the embodiment of a twelve-page newspaper printed and arranged as in Figs. 1 to 6 inclusive, the front sides of the sheets $a$, $b$ and $c$ contain the printed pages 1 and 7, 2 and 8, 3 and 9, and the back sides of the said sheets contain the printed pages 4 and 10, 5 and 11, 6 and 12.

In the embodiment shown in Figs. 7 and 8, the front sides of the sheets $a$, $b$ and $c$ contain the printed pages 1 and 7, 2 and 12, 3 and 11, and the back sides of the said sheets contain the printed pages 4 and 10, 5 and 9, 6 and 8.

In the embodiment shown in Figs. 9 and 10, the front sides of the sheets $a$, $b$ and $c$, contain the printed pages 1 and 2, 11 and 4, 9 and 6, and the back sides of said sheets contain the printed pages 7 and 8, 5 and 10, 3 and 12.

In the embodiment shown in Figs. 11 and 12, the front sides of the sheets $a$, $b$ and $c$ contain the printed pages 1 and 12, 3 and 10, 5 and 8, and the back sides of said sheets contain the printed pages 7 and 6, 9 and 4, 11 and 2.

In the embodiment shown in Figs. 13 and 14, the front sides of the sheets $a$, $b$ and $c$ contain the printed pages 1 and 2, 12 and 4, 10 and 6, and the back sides of said sheets contain the printed pages 8 and 7, 5 and 9, 3 and 11.

In the embodiment shown in Figs. 15 and 16, the front sides of the sheets $a$, $b$ and $c$ contain the printed pages 1 and 2, 3 and 12, 5 and 10, and the back sides of said sheets contain the printed pages 7 and 8, 9 and 6, 11 and 4.

In the embodiment shown in Figs. 17 and 18, the front sides of the sheets $a$, $b$ and $c$ contain the printed pages 1 and 7, 2 and 8, 3 and 9, and the back sides of said sheets contain the printed pages 4 and 10, 5 and 11, 6 and 12.

In the embodiment shown in Figs. 19 and 20, the front sides of the sheets $a$, $b$ and $c$ contain the printed pages 1 and 12, 2 and 11, 4 and 9, and the back sides of said sheets contain the printed pages 6 and 7, 8 and 5, 10 and 3.

In the embodiment shown in Figs. 21 and 22, the front sides of the sheets $a$, $b$ and $c$ contain the printed pages 1 and 12, 3 and 10, 5 and 8, and the back sides of said sheets contain the printed pages 7 and 6, 9 and 4, 11 and 2.

Figure 1:
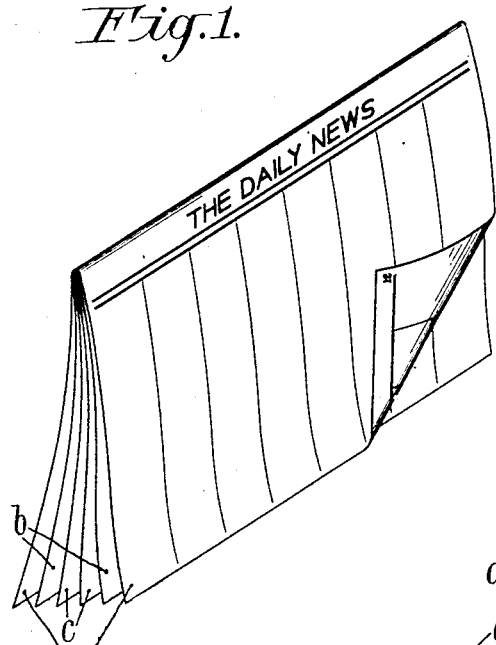
Figure 1 is a front view in perspective of a newspaper folded and printed according to one embodiment of my invention.
Figure 2:
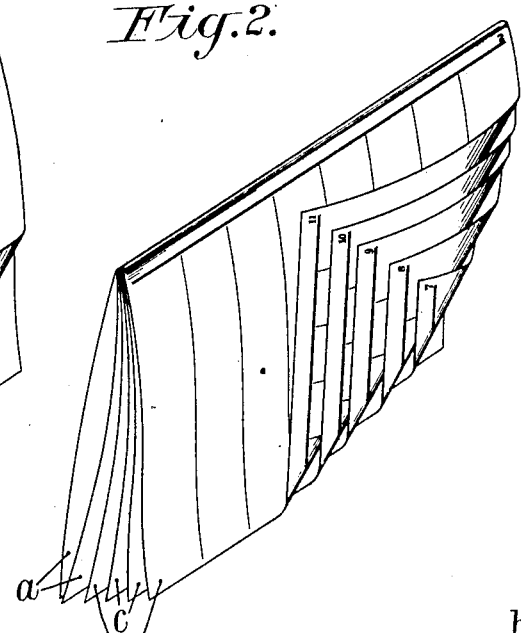
Fig. 2 is a similar view with the first leaf turned over.
Figure 3:
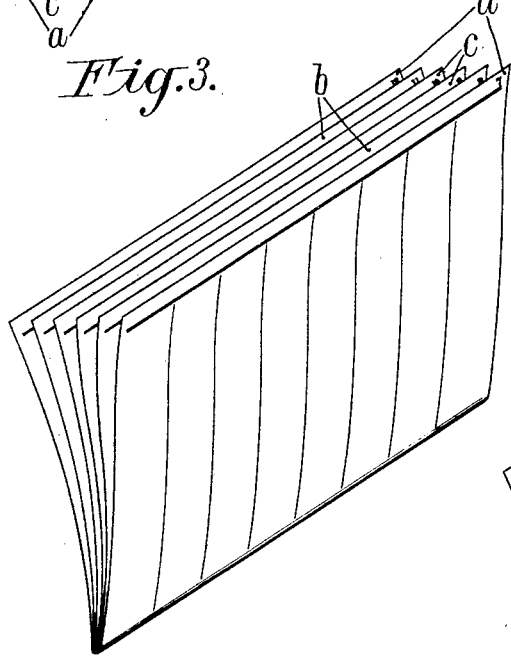
Fig. 3 is a back view in perspective.
Figure 4:
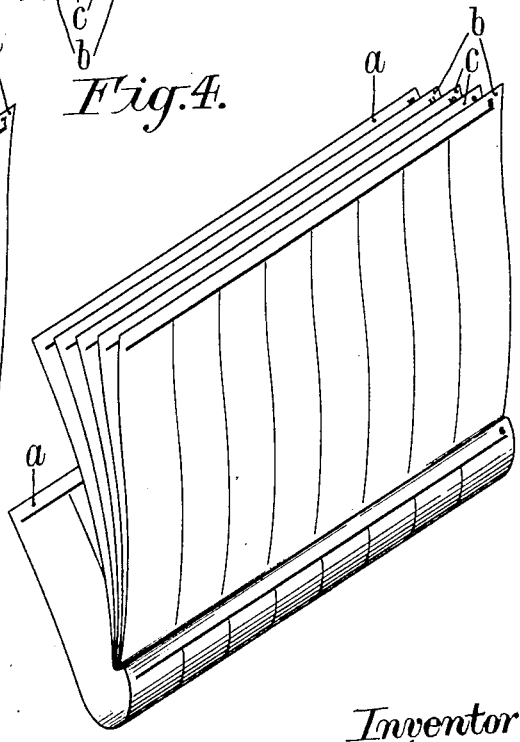
Fig. 4 is a similar view with the last leaf turned over.
Figure 23:
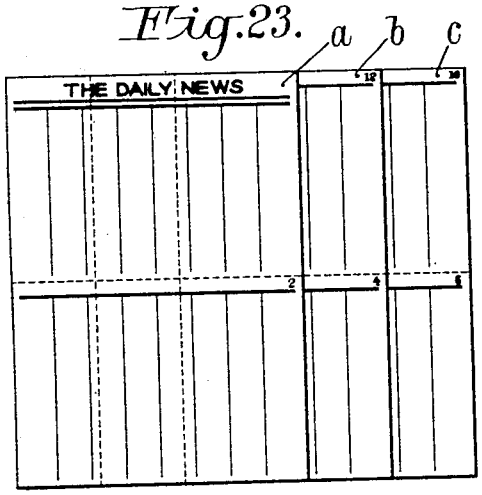
Figs. 23 and 24 are similar views of a tenth embodiment.
Figure 24:
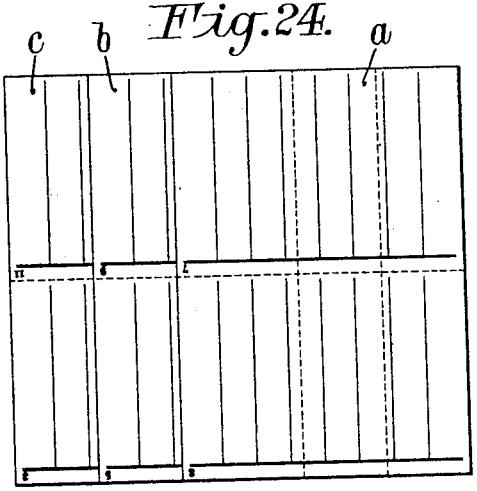

In the embodiment shown in Figs. 23 and 24, the front sides of the sheets $a$, $b$ and $c$ contain the printed pages 1 and 2, 12 and 4, 10 and 6, and the back sides of said sheets contain the printed pages 8 and 7, 5 and 9, 3 and 11.

In the embodiments illustrated in Figs. 1 to 14 inclusive, the heading for the first page starts at the fold line, while in the other embodiments the heading for the first page starts at the upper edge of the front sheet.

In all of the embodiments, the two pages on the side of any sheet read in the same direction and the two pages on one side of any sheet read in the opposite direction to the two pages on the other side of said sheet.

A newspaper produced according to this invention may be perused very conveniently and may be kept at all times within a reasonable lateral compass and may be readily perused by turning the leaves over so as to permit the leaves to fall by gravity into position to be easily grasped by the hands of the reader without any danger of wrinkling or tearing the newspaper.

By the term "newspaper" I wish to include all large products of an equivalent nature where the size of the product renders the same open to the disadvantages and defects enumerated, if they were printed or folded as heretofore and in which such disadvantages and defects would be remedied by the printing and folding of the same in a manner substantially as herein shown and described.

It is obvious that various embodiments herein shown and described are only a few of many embodiments which would be included by my invention; hence I do not wish to limit myself to the structures herein shown, but—

What I claim is:

1. A newspaper comprising a plurality of sheets, each sheet having two printed pages on each side thereof, and a fold line between the pages, the columns of printed matter running at right angles to the fold line, the two printed pages on each side of each sheet reading in the same direction when the newspaper is unfolded.

2. A newspaper comprising a plurality of sheets, each sheet having two printed pages on each side thereof, and a fold line between the pages, the columns of printed matter running at right angles to the fold line, the two printed pages on one side of each sheet reading in one direction and the two printed pages on the other side of each sheet reading in the opposite direction when the newspaper is unfolded.

In testimony that I claim the foregoing as my invention, I have signed my name in presence of two witnesses, this tenth day of November, 1914.

EDGAR H. COTTRELL.

Witnesses:
F. GEORGE BARRY,
C. S. SUNDGREN.